(12) United States Patent
Kurioka

(10) Patent No.: US 7,130,114 B2
(45) Date of Patent: Oct. 31, 2006

(54) CATOPTRIC OPTICAL SYSTEM

(75) Inventor: Yoshiaki Kurioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/819,876

(22) Filed: Apr. 7, 2004

(65) Prior Publication Data

US 2004/0196545 A1    Oct. 7, 2004

(30) Foreign Application Priority Data

Apr. 7, 2003    (JP)    ............................ 2003-102805

(51) Int. Cl.
- *G02B 21/00* (2006.01)
- *G02B 17/00* (2006.01)
- *G02B 23/00* (2006.01)

(52) U.S. Cl. ...................... 359/365; 359/730; 359/857; 359/858; 359/859

(58) Field of Classification Search ........ 359/364–366, 359/351, 726–730, 857–859; 353/37, 50, 353/51, 64, 66, 73, 77, 78, 99
See application file for complete search history.

(56) References Cited

U.S. PATENT DOCUMENTS

| | | | | |
|---|---|---|---|---|
| 4,572,659 A | * | 2/1986 | Omata | 355/67 |
| 4,927,256 A | * | 5/1990 | Lacuve | 359/858 |
| 5,309,276 A | | 5/1994 | Rodgers | 359/366 |
| 5,477,394 A | | 12/1995 | Shibazaki | 359/858 |
| 6,249,391 B1 | | 6/2001 | Hayakawa et al. | 359/834 |
| 6,648,483 B1 | * | 11/2003 | Kuo | 359/857 |
| 2003/0063400 A1 | | 4/2003 | Sunaga et al. | 359/861 |
| 2004/0105132 A1 | * | 6/2004 | Sunaga | 358/474 |

FOREIGN PATENT DOCUMENTS

| | | |
|---|---|---|
| EP | 0 271 737 | 6/1988 |
| EP | A 0 271 737 | 6/1988 |
| EP | 0 909 970 A1 | 4/1999 |
| EP | A 0 909 970 | 4/1999 |
| JP | 7-13157 | 1/1995 |
| JP | 2001-221949 | 8/2001 |
| JP | 2001-222063 | 8/2001 |
| JP | 2001-242381 | 9/2001 |

OTHER PUBLICATIONS

English Translation for JPA 2001-222063.
English Translation for JPA 2001-221949.
English Translation for JPA 2001-242381.
Communication from the European Patent Office dated Aug. 31, 2004 for Appl. No. 04252074.2-2217.
Office Action dated Sep. 14, 2005 corresponding to Patent Application No. 04 252 074.2-2217.

* cited by examiner

*Primary Examiner*—Drew A. Dunn
*Assistant Examiner*—Joshua L Pritchett
(74) *Attorney, Agent, or Firm*—Morgan & Finnegan, L.L.P.

(57) ABSTRACT

There is provided a compact, strong and high-performance catoptric optical system. This catoptric optical system has plural optical curved reflective surfaces. A gap between a pair of reflective surfaces, through which light incident upon said catoptric projection optical system passes, is the same gap between a pair of reflective surfaces, through which light exited from the catoptric projection optical system passes.

1 Claim, 6 Drawing Sheets

CATOPTRIC OPTICAL SYSTEM

This application claims a benefit of priority based on Japanese Patent Application No. 2003-102805, filed on Apr. 7, 2003, which is hereby incorporated by reference herein in its entirety as if fully set forth herein.

BACKGROUND OF THE INVENTION

The present invention relates to a reflection type of catoptric optical system, and is suitable, for example, for a projection optical system that projects light from an imaging device, such as a liquid crystal panel and a digital micromirror device ("DMD") manufactured by Texas Instruments Incorporated, onto an object surface, such as a screen.

Prior art has proposed to shorten an optical path length in an optical system for a compact catoptric system that includes plural optical reflective surfaces.

Japanese Patent Application, Publication No. 2001-222063 has proposed a compact rear projection optical system that uses three curved mirrors to properly extend a screen diagonal length relative to an optical path length, and enables two plane mirrors to easily return or turn around the light.

Japanese Patent Application, Publication No. 2001-221949 has proposed a thin and compact oblique incidence optical system that uses four reflective surfaces to properly adjust a ratio between a distance from a final reflective surface to a screen and a distance from a final reflective surface to a lens system, maintains an optical path length for turnaround of the light, and arranges a return mirror.

Another proposed technology has arranged a curved mirror on an optical path to prevent an expansion of the optical path in the optical system for a compact structure.

For example, Japanese Patent Application, Publication No. 2001-242381 sets a spherical mirror just before a screen in addition to a three- or four-aspheric mirror system to produce a rear projection monitor catoptric imaging optical system that includes totally four or five mirrors.

Japanese Patent Application, Publication No. 07-013157 (corresponding to U.S. Pat. No. 5,477,394) has proposed a projection optical system that introduces light from a first focal point in an ellipsoidal mirror into a second focal point, accords the second focal point of the ellipsoidal mirror with a focal point of a parabolic mirror, and collimates light introduced into the focal point of the inclined parabolic mirror, obliquely projecting the collimated light onto a screen.

However, when plural optical surfaces are provided as in Japanese Patent Applications, Publication Nos. 2001-222063, 2001-221949 and 2000-104095, light's different entrance and exit gates need plural openings for the light to pass through, and thus more and longer spacing among mirrors by the openings, disadvantageously enlarging the optical system.

The projection optical system disclosed in Japanese Patent Application, Publication No. 07-013157 generates aberration since rays other than a principal ray do not pass through the first focal point in the ellipsoidal mirror. The same ray generates aberration at the second focal point in the ellipsoidal mirror, and an enlarged image incident upon the parabolic mirror increases the aberration on the screen, remarkably deteriorating imaging performance.

The conventional optical system that uses plural optical reflective surfaces requires a retainer mechanism that has at least two clearances for light to pass through, and thus has a difficulty in maintaining strength.

BRIEF SUMMARY OF THE INVENTION

Accordingly, it is an exemplified object of the present invention to provide a smaller, stronger and higher-performance catoptric optical system than the prior art.

A catoptric optical system of one aspect according to the present invention includes plural reflective surfaces, each of which is a curved surface, wherein a gap between a pair of reflective surfaces, through which light incident upon the catoptric projection optical system passes, is the same gap between a pair of reflective surfaces, through which light exited from the catoptric projection optical system passes.

DETAILED DESCRIPTION OF THE PREFERRED EMBODIMENTS

Figure 1:
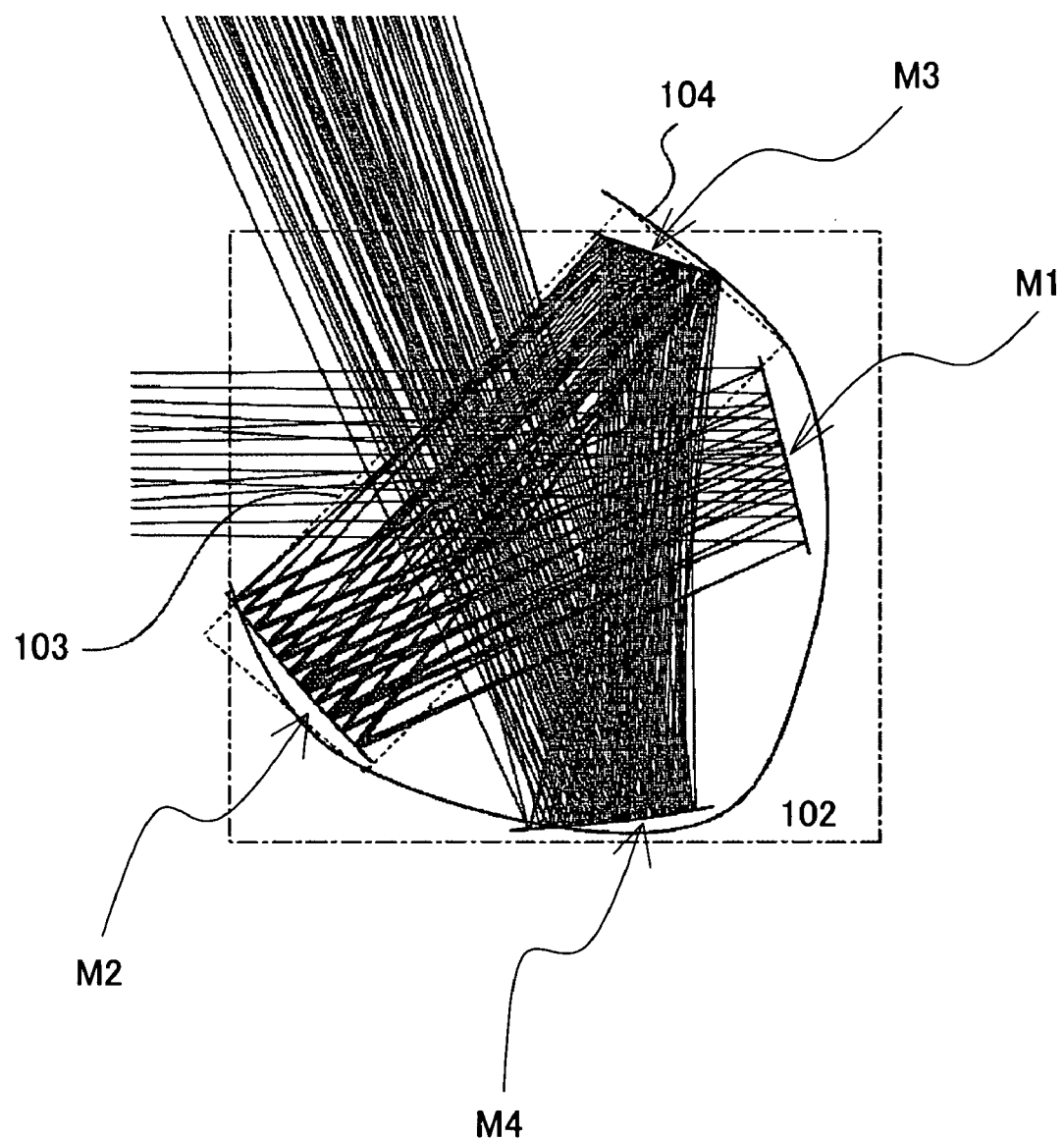
FIG. 1 is an optical-path diagram in a catoptric optical system of a first embodiment according to the present invention.
Figure 2:
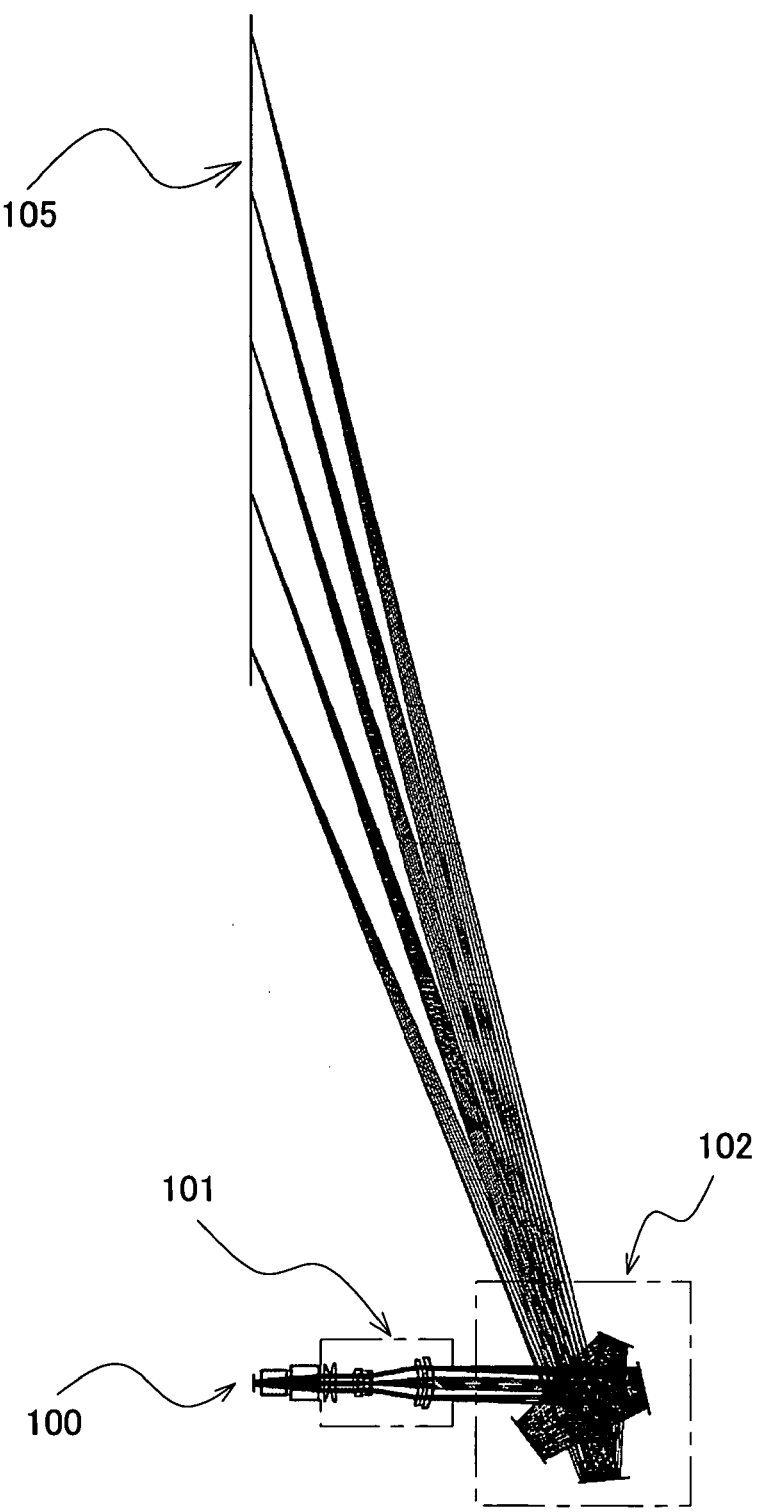
FIG. 2 is an overview of a projection optical system that includes the catoptric optical system of the first embodiment.
Figure 3:
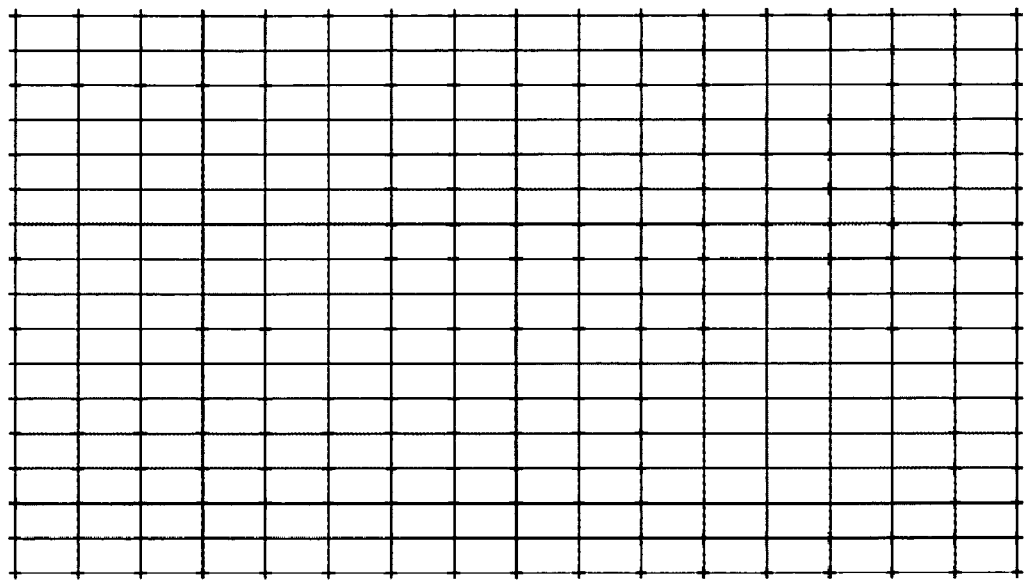
FIG. 3 shows distortion on an image surface in the projection optical system of the first embodiment.

FIG. 1 is an optical-path diagram in a catoptric optical system of a first embodiment according to the present invention. FIG. 2 is an overview of a projection optical system in a projector that includes the catoptric optical system of the first embodiment. FIG. 3 shows distortion on an image surface in this projection optical system. FIG. 2 omits an illumination optical system for illuminating a display device, such as a LED panel.

In FIGS. 1 and 2, 100 is a display device that modulates and emits incident light, 101 is a refractive optical system (dioptric optical system) as part of a projection optical system, 102 is a catoptric optical system as part of the projection optical system, 103 is an area (enclosed by a dotted line) in which an opening that allows the light to pass through it is located in a gap between a pair of optical reflective surfaces, 104 schematically shows a retainer mechanism, and 105 is a screen, onto which an image formed by the display device 100 is projected by the projection optical system. The refractive optical system 101 includes plural refractive surfaces having a rotationally symmetrical shape around a common axis. The catoptric optical system 102 includes plural reflective surfaces having a rotationally asymmetrical shape that does not have a common axis.

The light from the display device 100 is properly refracted by the refractive optical system 101, and then incident upon the catoptric optical system 102. The catoptric optical system 102 includes four optical reflective surfaces M1 to M4 each having a rotationally asymmetrical surface that does not have a rotational symmetrical axis. The incident light passes through the gap between the optical reflective surfaces M2 and M3 among four surfaces. The light incident upon the catoptric optical system 102 is sequentially reflected on the optical reflective surfaces M1, M2, M3 and M4 in this order totally four times and exited from the catoptric optical system 102. An optical path (between the optical reflective surfaces M1 and M4) intersects once inside the catoptric optical system 102. The light that is about to enter the optical reflective surface M1 as a first reflective surface intersects twice with the optical path between the optical reflective surfaces M1 and M4. The light that has been exited from the optical reflective surface M4 as a final reflective surface intersects twice with the optical path between the optical reflective surfaces M1 and M4. The light incident upon the optical reflective surface M1 intersects with the light that has been reflected on the optical reflective surface M4. The light exited from the catoptric optical system 102 passes through an opening in the gap 103 between a pair of optical reflective surfaces M2 and M3. In other words, the incident light passes through the same gap. Therefore, the retainer mechanism 104 for holding the catoptric optical element 102 may have only one opening, and can maintain its strength. A position and size of the opening are determined so as not to shield the light that passes through the catoptric optical system.

This projection optical system forms a pupil image in the gap 103 between the pair of optical reflective surfaces M2 and M3. Therefore, the gap between the optical reflective surfaces can narrow a section in an exiting direction form the optical reflective surface 102. In general, a stop (located in the refractive optical system 101 in this embodiment) as light shielding means in an optical system serves as vignetting that shields a marginal ray in an off-axis ray, and the light is constricted between the front and back of the stop. The instant embodiment forms a constricted pupil image conjugate with the stop in the area in the gap 103 between the pair of optical reflective surfaces M2 and M3, and shortens a surface separation in this area between the pair of optical reflective surfaces M2 and M3, making the catoptric optical system 102 compact. An actual image of a pupil when formed just before the catoptric optical system would be able to make the incident light diameter small. This configuration is preferable for a compact area in the gap 103 between the pair or optical reflective surfaces M2 and M3.

When the light exited from the catoptric optical system 102 forms an image conjugate with the light shielding means near a position possibly closest to the catoptric optical system 102, or when the image conjugate with the light shielding means is provided at the gap 103, narrower exit light can be obtained and an area in the gap 103 between the pair of optical reflective surfaces M2 and M3 can be made small. When the area in the gap 103 between the pair of optical reflective surfaces M2 and M3 can be made small, the catoptric optical system 102 that has an opening in the area can be made small and the retainer mechanism 104 may reduce the number of openings to one to pass the light, maintaining the strength.

Although the instant embodiment introduces the light from the refractive optical system 101 to the catoptric optical system 102, the inventive catoptric optical system can receive the light emitted from the display device 100 directly or from another catoptric optical element.

Figure 4:
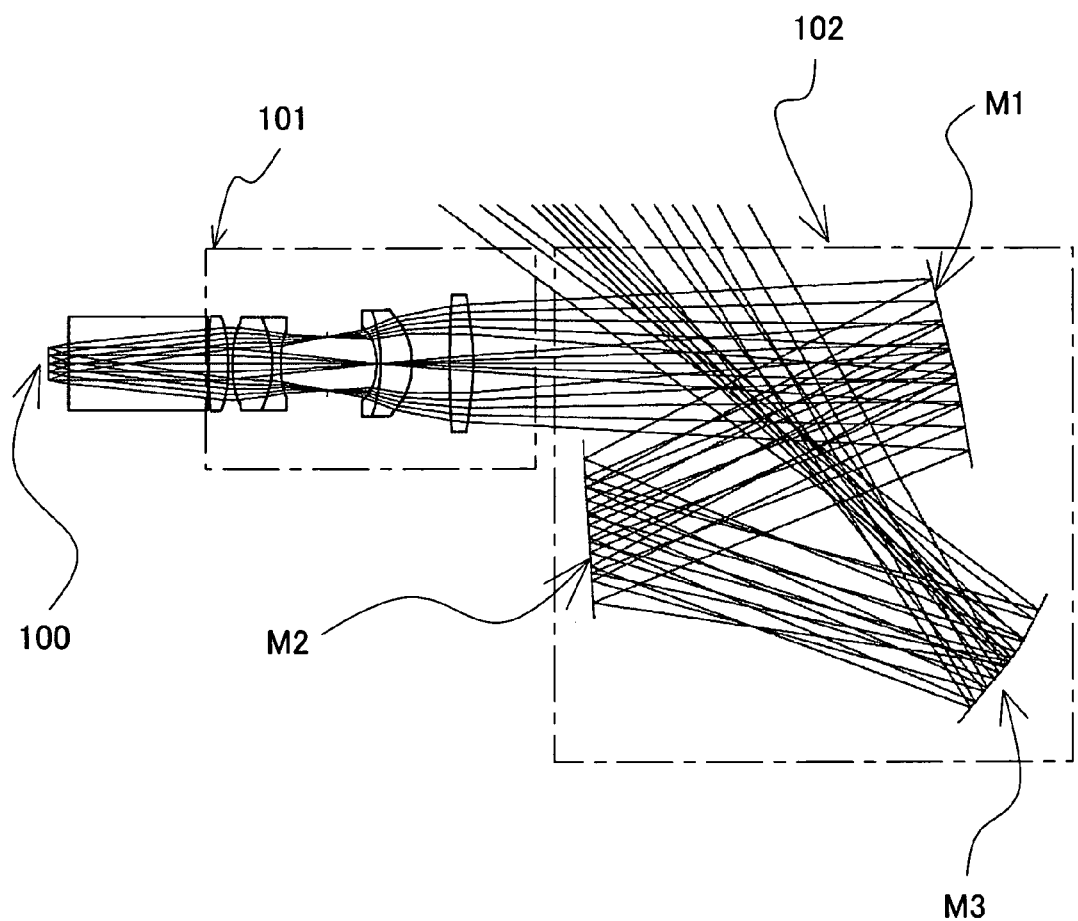
FIG. 4 is an optical-path diagram in a catoptric optical system of a second embodiment according to the present invention.
Figure 5:
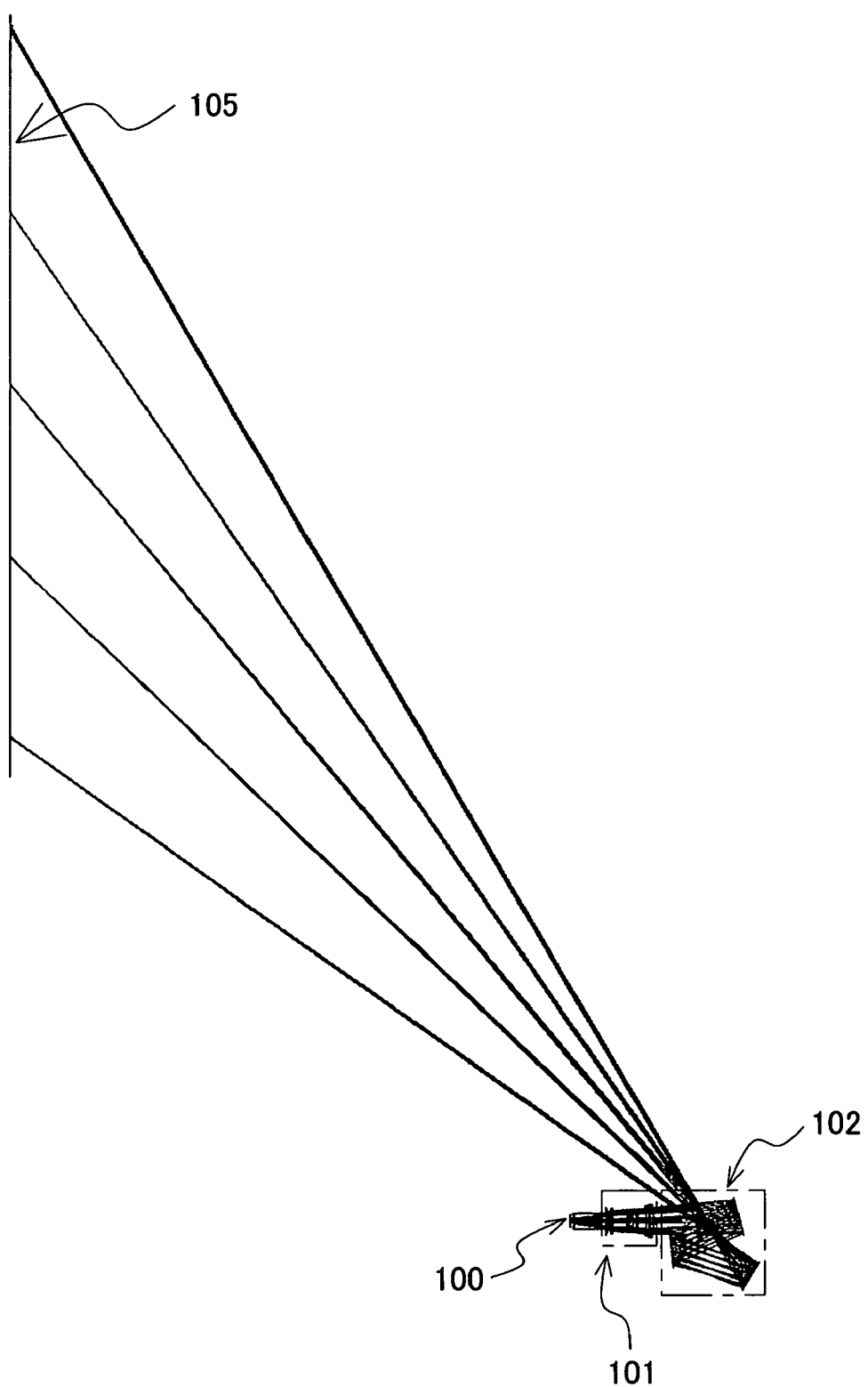
FIG. 5 is an overview of a projection optical system that includes the catoptric optical system of the second embodiment.
Figure 6:
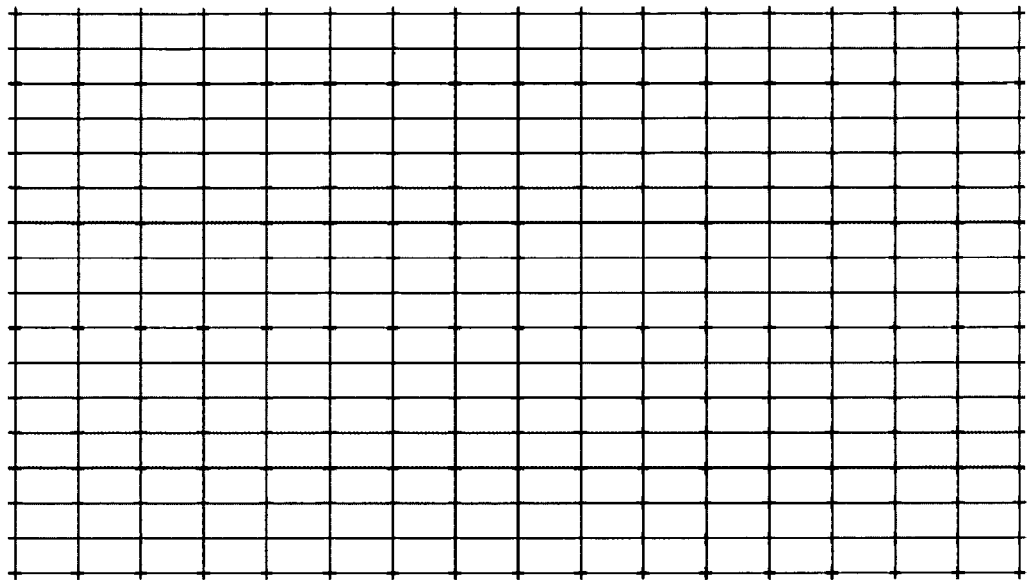
FIG. 6 shows distortion on an image surface in the projection optical system of the second embodiment.

FIG. 4 is an optical-path diagram in a catoptric optical system of a second embodiment according to the present invention. FIG. 5 is an overview of a projection optical system in a projector that includes the catoptric optical system of the second embodiment. FIG. 6 shows distortion on an image surface in this projection optical system. A description of the reference numerals is similar to that for the first embodiment, and thus omitted.

The catoptric optical system 102 in the instant embodiment includes three optical reflective surfaces M1 to M3, and light passes through a gap between two of them, i.e., the optical reflective surfaces M1 and M2. The incident light is sequentially reflected on the optical reflective surfaces M1, M2 and M3 in this order totally three times in the catoptric optical system 102, and then exited from it. An optical path between the optical reflective surfaces M1 and M3 inside the catoptric optical system 102 (although not shown in the instant embodiment) intersects once with the light that has been reflected on the reflective optical surface M3 as a final reflective surface. The light that is about to enter the optical reflective surface M1 intersects with the light that has been exited from the optical reflective surface M3. The light exited from the catoptric optical system 102 passes through an opening in the same gap 103 between the pair of optical reflective surfaces M2 and M3. In other words, the incident light passes through the same gap. Therefore, the retainer mechanism for holding the catoptric optical element 102 may have only one opening, and the optical system can be made small.

What is claimed is:

1. A projector comprising:
   a display device; and
   an optical system which projects light from the display device,
   wherein the optical system comprises:
   plural reflective surfaces; and
   a refractive optical system introducing light from a light source to the reflective surfaces,
   wherein the reflective surfaces includes first, second, third and fourth reflective surfaces each having a curved surface, and the first, second, third and fourth reflective surfaces are arranged so that:
   the light introduced from the refractive optical system reflects on the first, second, third and fourth reflective surfaces in this order
   the light reaching the first reflective surface from the refractive optical system passes between the second and third reflective surfaces;
   the light reaching the second reflective surface from the first reflective surface intersects with the light reaching the fourth reflective surface from the third reflective surface; and
   the light reflected on the fourth reflective surface passes between the second and third reflective surfaces.

* * * * *